United States Patent [19]

Scott

[11] Patent Number: 5,301,342

[45] Date of Patent: Apr. 5, 1994

[54] PARALLEL PROCESSING COMPUTER FOR SOLVING DENSE SYSTEMS OF LINEAR EQUATIONS BY FACTORING ROWS, COLUMNS, AND DIAGONAL, INVERTING THE DIAGONAL, FORWARD ELIMINATING, AND BACK SUBSTITUTING

[75] Inventor: David S. Scott, Portland, Oreg.

[73] Assignee: Intel Corporation, Santa Clara, Calif.

[21] Appl. No.: 632,462

[22] Filed: Dec. 20, 1990

[51] Int. Cl.$^5$ .................. G06F 15/347; G06F 15/32
[52] U.S. Cl. .................. 395/800; 364/735;
364/736; 364/754; 364/194; 364/937.1;
364/931.03; 364/931.42; 364/931.01;
364/931.41; 364/DIG. 2
[58] Field of Search ............... 395/800; 364/133, 194,
364/719, 735, 736, 754

[56] References Cited

U.S. PATENT DOCUMENTS

| | | | |
|---|---|---|---|
| 4,787,057 | 11/1988 | Hammond | 364/754 |
| 4,914,615 | 4/1990 | Karmarkar et al. | 364/754 |
| 4,947,480 | 8/1990 | Lewis | 364/572 |
| 5,136,538 | 8/1992 | Karmarkar et al. | 364/754 |
| 5,163,015 | 11/1992 | Yokota | 364/578 |

Primary Examiner—Thomas C. Lee
Assistant Examiner—Paul Harrity

[57] ABSTRACT

A parallel processing computer system for solving a system of linear equations having coefficients residing in a first matrix and right-hand sides of the linear equations residing in a first vector. The first matrix is divided into a plurality of ND row disk sections, a plurality of ND column disk sections and ND diagonal disk sections. Each of these sections, in a preferred embodiment, are known as disk sections, and are stored on non-volatile media such as magnetic and/or optical disks. Further, the equations are defined by the first vector, the first vector comprising ND sections. Each of the plurality of j row sections and j column sections is factored. Then, the j diagonal section is factored and inverted. In a preferred embodiment, the inversion uses a Gauss-Jordan technique. These steps are repeated for all values of j that range between 1 and ND. Then, forward elimination is performed for all sections in the first vector using the first matrix, and back substitution is performed for all sections in the first vector using the first matrix.

11 Claims, 15 Drawing Sheets

PARALLEL PROCESSING COMPUTER FOR SOLVING DENSE SYSTEMS OF LINEAR EQUATIONS BY FACTORING ROWS, COLUMNS, AND DIAGONAL, INVERTING THE DIAGONAL, FORWARD ELIMINATING, AND BACK SUBSTITUTING

BACKGROUND OF THE INVENTION

1. Field of the Invention

The present invention relates to an apparatus and method for solving large dense systems of linear equations on a parallel processing computer. More particularly, this invention relates to an efficient parallel processing method throughout which solves dense systems of linear equations (those containing approximately 25,000 variables) wherein the system efficiently utilizes the computing and input/output resources of the parallel processing computer and minimizes idle time of those resources.

2. Prior Art

For some applications, such as determining the radar cross-section of aircraft, or simulating flow across an airfoil, very large systems of linear equations are used. These linear equations sometimes range on the order of 25,000 variables or more. It therefore is necessary to solve very large matrices comprising approximately $25,000 \times 25,000$ elements or more for solving these linear equations. This is typically difficult to accomplish on prior art linear algebra computers due to their inherent limitations, such as processing power, or input/output device speed. Also, general limitations have prevented the solutions for these problems, such as bandwidth and the cost of super-computing resources. Parallel computing architectures have been used for solving certain types of problems, including systems of linear equations, since many small processors may perform certain operations more efficiently than one large high-speed processor, such as that present in a typical super computer. The practical limitations in partitioning the problem to be solved in the parallel-processing machines, however, has hindered the usefulness of this architecture.

In a parallel processing machine, it is necessary to break down a problem (such as the operations to solve a large matrix representing a system of linear equations) into a series of discrete problems in order for the system to generate a solution. Segmenting such a problem is a nontrivial task, and must be carefully designed in order to maximize processing by each of the parallel nodes, and minimize input/output operations which must be performed. This is done so that the system does not spend the majority of the time performing input/output operations (thereby becoming "I/O bound") while the computing resources in the system remain substantially idle. Therefore, one goal of designing systems and problems is to maximize the amount of time that the system is processing. Another goal of parallel processing architectures in implementing very large matrix solutions, is to balance the I/O capacity of the system so that the system does not become totally "compute-bound" (e.g. processing only, no input/output operations) and the I/O units remain idle.

Another problem with parallel processing computers is that large chunks of a matrix (perhaps the entire matrix) need to be loaded into main memory of each parallel processing node in order to compute the solution. Given that very large matrices require vast amounts of computer main memory, certain systems perform matrix solutions "out-of-core." In other words, elements within the matrix that are not needed at a particular time may be written off to disk, and/or spooled to tape, for later retrieval and operation upon in the main memory of each node in the parallel processing system. Such an arrangement provides an easy system of maintaining backups (since they are constantly being spooled off to tape, disk or other similar media), as well as providing a natural check-point at which computation may resume if computer system power is lost, a system malfunction occurs or some other event occurs which halts processing. Given the long time period for solving very large matrices (up to a full real-time month for some very large systems, for example, those containing $100,000 \times 100,000$ elements), the possibility of losing system power or another type of malfunction may prove fatal to solving the matrix. Such a system may be termed an "out of core solver."

SUMMARY AND OBJECTS OF THE INVENTION

One object of the present invention is to provide for a method which is especially tuned for solving large matrix problems on parallel processing computers.

Another object of the present invention is to provide a method for breaking down a system of large linear equations for an efficient solution by a parallel processing computer.

These and other objects of the invention are provided for by a method in a parallel processing computer of solving a system of linear equations having coefficients residing in a first matrix and right-hand sides of the linear equations residing in a first vector. The first matrix is divided into a plurality of ND row sections, a plurality of ND column sections and ND diagonal sections. Each of these sections, in a preferred embodiment, are known as disk sections, and are stored on non-volatile media such as magnetic and/or optical disks. Further, the equations are defined by the first vector, the first vector comprising N sections. Each of the plurality of j row sections and j column sections is factored. Then, the j diagonal section is factored and inverted. In a preferred embodiment, the inversion uses a Gauss-Jordan technique. These steps are repeated for all values of j that range between 1 and ND. Then, forward elimination is performed for all sections in the first vector using the first matrix, and back substitution is performed for all sections in the first vector using the first matrix.

BRIEF DESCRIPTION OF THE DRAWINGS

The present invention is illustrated by way of example and not limitation in the figures of the accompanying in which like references indicate similar elements and in which.

DETAILED DESCRIPTION

A method for solving a very large dense system of linear equations in a parallel processing computer is described. In the following description for the purposes of explanation, specific memory lengths, input/output devices, architectures, and matrix sizes are set forth in order to provide a thorough understanding of the present invention. It will be apparent, however, to one skilled in the art that the present invention may be practiced without these specific details. In other instances, well known circuits and devices are shown in block diagram form in order to not unnecessarily obscure the present invention.

Figure 1:
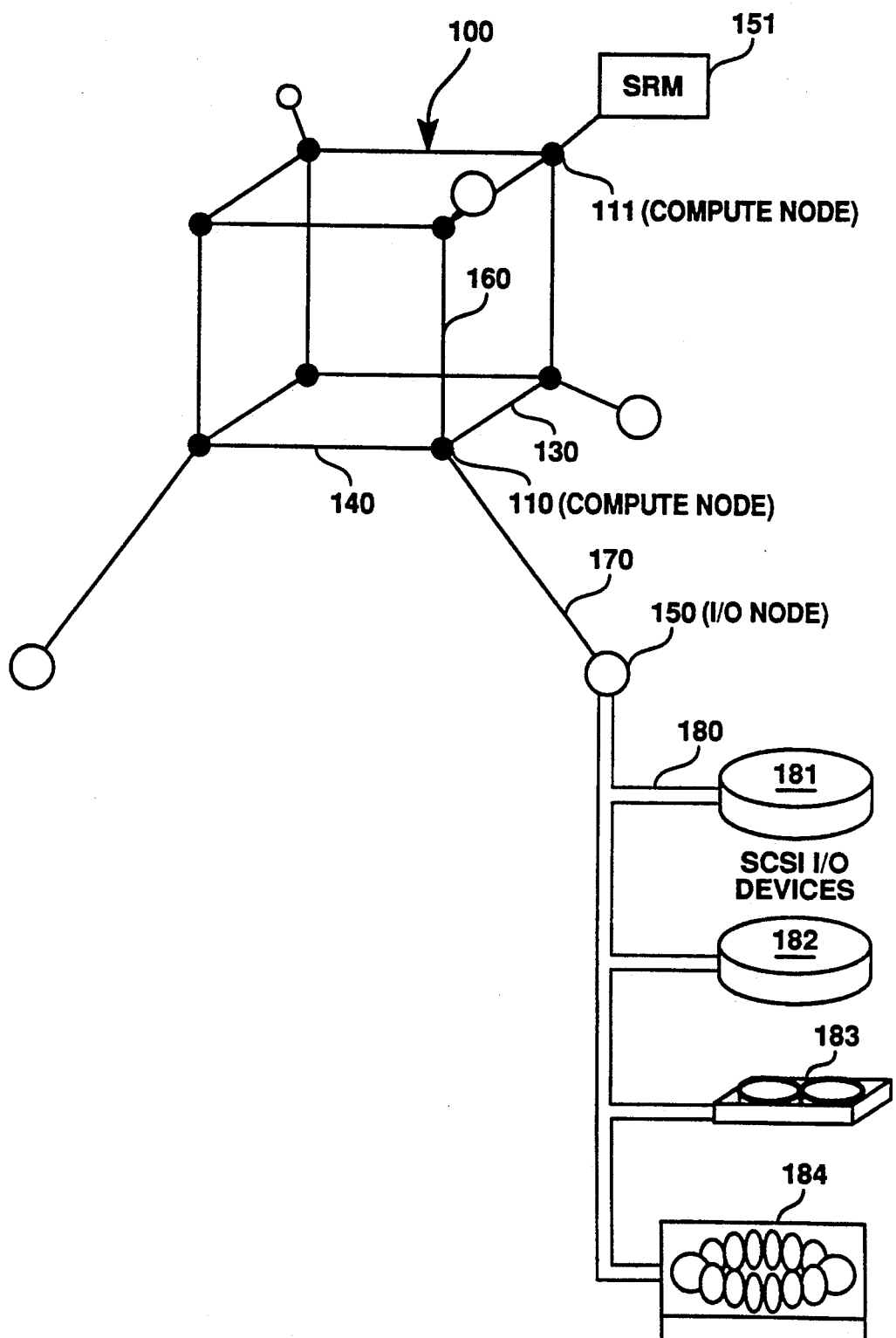
FIG. 1 shows the parallel processing architecture of the preferred embodiment.

Referring to FIG. 1, the apparatus on which the method of the preferred embodiment is shown generally as 100 in FIG. 1. System 100 is a parallel processing machine known as the Intel iPSC®/860 computer manufactured by Intel ® Corporation's Supercomputer Systems Division of Beaverton, Oreg. (Intel and iPSC are registered trademarks of Intel Corporation of Santa Clara, Calif.). System 100 is also known generically as the "hypercube." Note that system 100 generally comprises a series of nodes such as 110 and 150 shown in FIG. 1 in system 100 which are inter-connected by series of channels such as 130, 140 and 160 within system 100. A node may be an input/output (I/O) node such as 150 or a compute node, such as 110 shown in FIG. 1. System 100 as shown in FIG. 1 implements a distributed computing system wherein input/output devices are available to all other nodes in system 100 through their respective I/O nodes such as 150 and their compute nodes such as 110.

I/O node 150 is coupled to compute node 110 through a line 170. It is also coupled to a series of I/O devices such as disk drives 181 and 182, tape drive 183 or optical disk carousel 184. These devices are coupled to I/O node 150 through bus 180 shown in FIG. 1. In the preferred embodiment, each of the I/O devices 181-184 are small computer system interface (SCSI) devices allowing transfer rates of up to 1 megabyte per second to I/O node 150. In the preferred embodiment, disks 181 and 182 are Winchester class sealed SCSI hard disk drives, and which, at this time, have a maximum storage capacity of approximately 760 megabytes. Tape drive 183, in the preferred embodiment, is an 8 millimeter helical scan digital tape drive typically used in video tape applications. It has an approximate capacity equal to three disk drives such as 181 and 182. Tape drive 183 allows the spooling of entire disk drives such as 181 and 182 onto the tape drive for later processing, or it may be used for performing backup operations. Lastly, I/O node 150 may be coupled to an optical disk drive carousel unit 184. 184 may be optical disk drive carousel ("a CD ROM jukebox") or may be a very large single optical drive unit in an alternative embodiment. Optical disk drive 184 has a mechanism which allows access to any one of many rewritable optical disks contained within unit 184. This gives system 100 access to many gigabytes of data since these optical disks have a capacity of approximately half a gigabyte. In systems having more than 25,000 variables, the use of large amounts of fixed media storage, such as optical disk carousels, is required. In the preferred embodiment, I/O node 150 is an 80386 microprocessor manufactured by Intel Corporation of Santa Clara, Calif.

I/O node 150 is interconnected with it's corresponding compute node such as 110 in system 100 shown in FIG. 1 through a high speed network known as the Direct-Connect ™ network manufactured by Intel Corporation of Santa Clara, Calif. Each Direct-Connect ™ channel such as 170 shown in FIG. 1 is a high capacity dedicated connection allowing bidirectional transfers at a rate of up to 5.6 megabytes per second. This channel allows access to all nodes in system 100 by each of the other nodes. All I/O nodes such as 150 and I/O devices such 181-184 are treated on system 100 as one logical entity using the Concurrent File System (CFS), also a product of Intel Corporation of Santa Clara, Calif. In other words, even if access is made to different I/O nodes and devices by other computing nodes in system 100 than 110, these devices appear as one logical entity to the node requesting the access. The CFS of the preferred embodiment exploits parallel access to all I/O devices and all processors for efficient, automatic routing of I/O requests and data over the network. When large files are created by a single compute node, CFS automatically distributes the files among the available I/O devices. When many small files are accessed, the load is typically distributed among available I/O devices, available I/O channels, and the internal communication channels within system 100.

The Direct-Connect ™ communications system shown generally in FIG. 1, comprising input/output nodes such as 150, and compute nodes such as 110, are connected in a topology known as the "hypercube." Each compute node such as 110 is connected with individual channels such as 130, 140, and 160 wherein each node has N neighbors. The maximum value of N, in the preferred embodiment, is 7. Therefore, in the hypercube topology of the preferred embodiment, a maximum of 128 compute nodes ($2^N$ where N=7) may reside in the system. Each compute node can connect to at most one I/O node such as 150. Although FIG. 1 only shows eight compute nodes for illustration purposes, in the preferred embodiment, 64 compute nodes reside in system 100. In alternative embodiments, this value may be another power of two. In the preferred embodiment, system 100 has only eight I/O nodes, most of the compute nodes not being coupled to a corresponding I/O node. Also, one compute node 111 in system 100 does not have a corresponding I/O node. This is because compute node 111 is coupled to a front-end unit known as the System Resource Manager (SRM) 151 as shown in FIG. 1. The topology of system 100 allows nodes residing anywhere in the hypercube to communicate with other nodes residing in the hypercube thus sharing resources such as disk drives, tape drives, and other computing resources as if they were directly connected to the node. System 100 allows bidirectional transfers at rates of up to 5.6 megabytes per second within the hypercube. Even if a resource requested is coupled to another compute node, the response from the I/O request given by a node is as if the resource is directly connected to the node. A detailed description of the Direct-Connect TM communications technology used in system 100 of the preferred embodiment may be found in U.S. patent application Ser. No. 07/298,551, now abandoned, whose inventor is Stephen F. Nugent.

Figure 2:
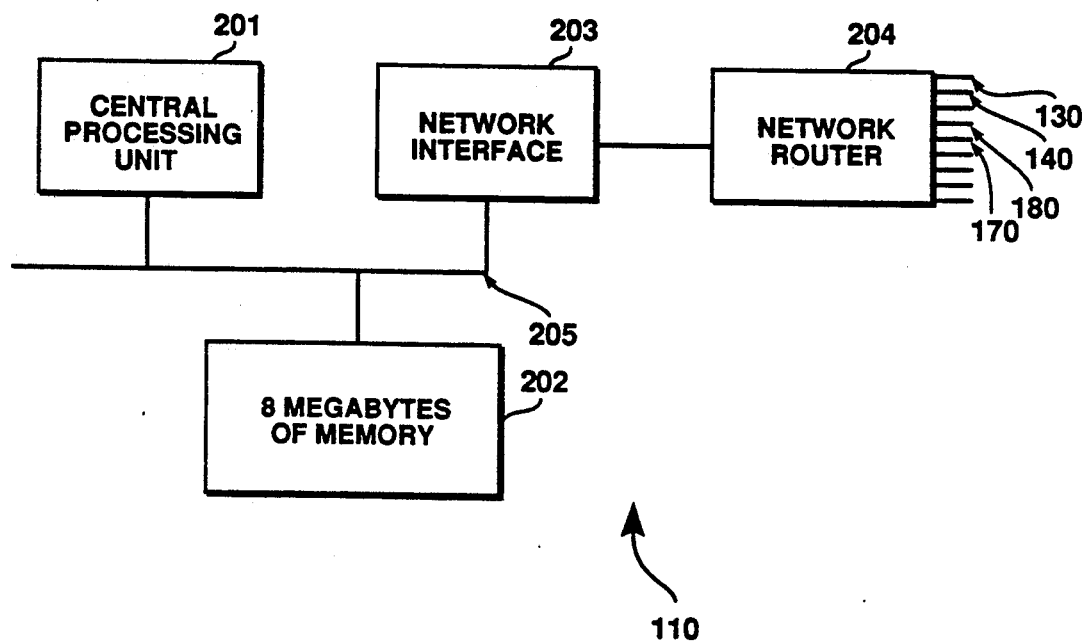
FIG. 2 shows the internal architecture of one compute node of the preferred embodiment.

As shown in FIG. 2, each compute node comprises an i860 TM RISC (reduced instruction set computer) central processing unit 201 manufactured by Intel Corporation of Santa Clara, Calif. Each compute node such as 110 comprises a bus 205 which is coupled to the i860 TM central processing unit. Further, bus 205 provides communication between central processing unit 201 and 8 megabytes of random access memory 202 for storing and processing of variables assigned to node 110. Further, bus 205 is coupled to network interface 203 which allows communication with other nodes in system 100. Network interface 203 is coupled to a network router 204 which will route the message transmitted by one compute node such as 110 to an appropriate receiving node in system 100. As shown in FIG. 2, network router 204 provides the coupling to node 110 external communication channels, such as 130, 140, and 160 shown in FIGS. 1 and 2. Network router 204 ensures that the messages sent by node 110 are transmitted to the appropriate receiving node over lines such as 130, 140, and 160 shown in FIG. 1.

OUT OF CORE SOLVER

Because computing the solution for matrices exceeding 25,000×25,000 elements in size are well beyond the main memory capacity of any known computing system, during processing, it is necessary to store portions of the matrix upon on magnetic disk, optical disk or tape storage. This will allow the matrix representing the system of linear equations to be essentially any size since only portions of the matrix will reside in computer main memory at any given time. The remainder of the matrix will be resident on various I/O devices such as disk or tape drives. This system of linear equations will have the form of:

$$AX = B$$

where A is a square matrix of dimensions N×N, B is a N×K matrix of right hand sides of the equation, and X is the matrix of unknowns. In order to maximize the capacity of the central processing units, minimize loading of the I/O and interprocessor communication channels in system 100, and allow for periodic check-pointing to allow a restart in the event of a system failure or operator interruption, most of the elements of the matrices being operated upon are stored "out-of-core" on disk storage.

Figure 3:
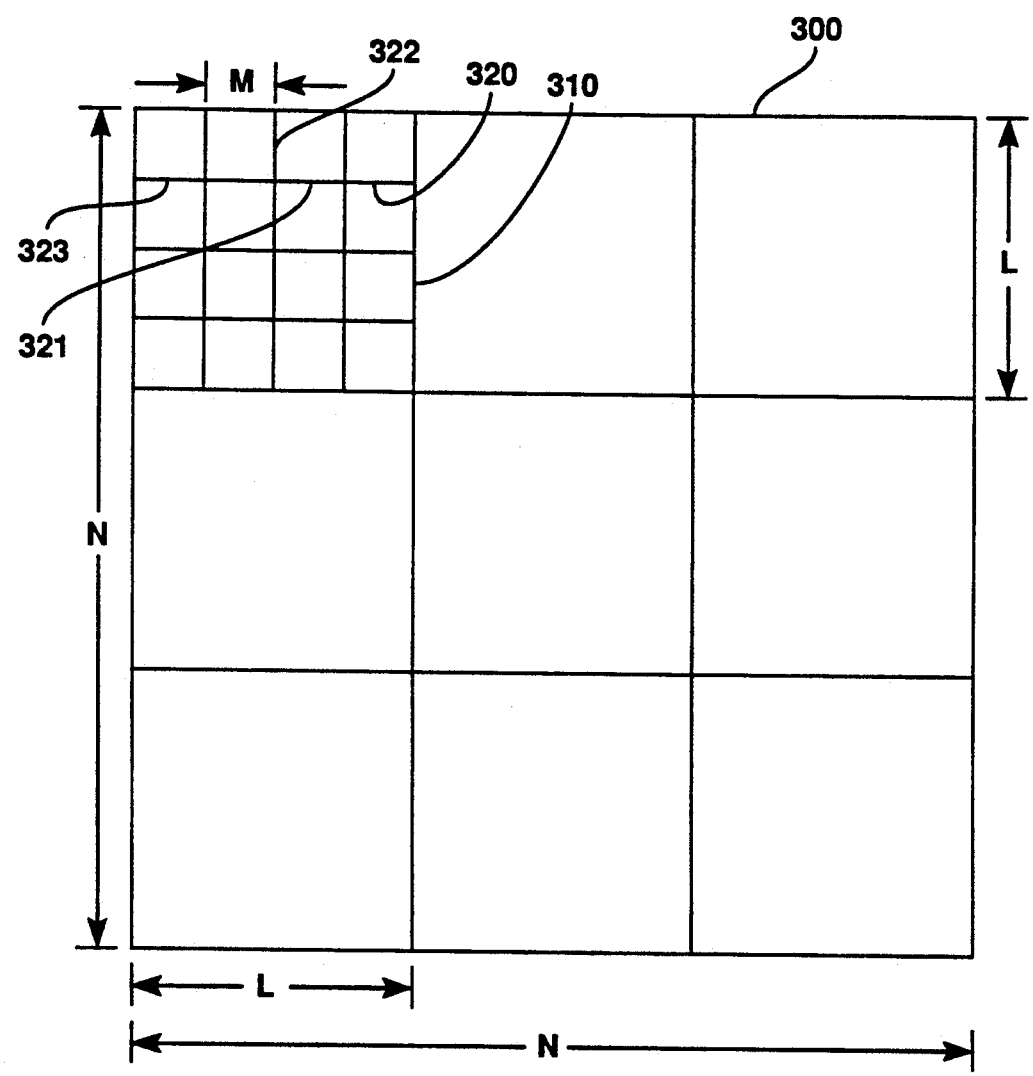
FIG. 3 shows a matrix which is to be solved by being divided into node and disk sections.

In the preferred embodiment, magnetic disk storage only is used for augmenting the main memory of system 100 for a matrix of up to size 25,000×25,000. Optical disk or tape storage is used for larger problems. A disk block (or disk section) is a portion of the matrix which is stored "out-of-core" on units such as 181 and 182 shown in FIG. 1, and whose size is determined as follows. As shown in FIG. 3, an arbitrary matrix 300 may be of dimensions N×N. Such a matrix may be divided into smaller square blocks such as 310 shown in FIG. 3, each block being stored to disk. Each block, known as a disk section, is of size L×L elements. Each disk section such as 310 further comprises square sections such as 320, 321, 322, and 323 which are dimensions M×M and are known as node blocks or node sections. Node sections are particular portions of the disk sections which is solved by a particular compute node such as 110 shown in FIG. 1. Each disk section size (L) is determined by the number of compute nodes in system 100, and the memory and fixed storage capacity of each of these nodes. In system 100, each disk section such as 310 comprises 64 M×M node sections because there are 64 computing nodes in the preferred embodiment. In FIG. 3, however, only sixteen node sections are shown for illustration purposes. In the preferred embodiment, taking into account double buffering and the three variables required from each node block, each node section size is limited to 0.9 megabytes of each computing node's memory. This translates into a node block of dimensions 224 elements×224 elements. In the preferred embodiment, therefore, M is 224, and L is 1824. Each disk section such as 310 shown in FIG. 3 therefore contains 1792×1792 elements. Although L equals 1792 in the preferred embodiment, this particular value will vary depending on each node's capacity, the number of processors and the particular problem size in alternative embodiments. In the preferred embodiment, the number of disk sections in a row of the matrix is equal to ND, and the dimensions of the matrix in disk sections is ND×ND. The total number of disk sections in the rows or columns of the matrix is therefore equal to ND(ND−1)/2. These particular limitations should not be viewed as limiting the scope of the present invention.

Figure 4A:
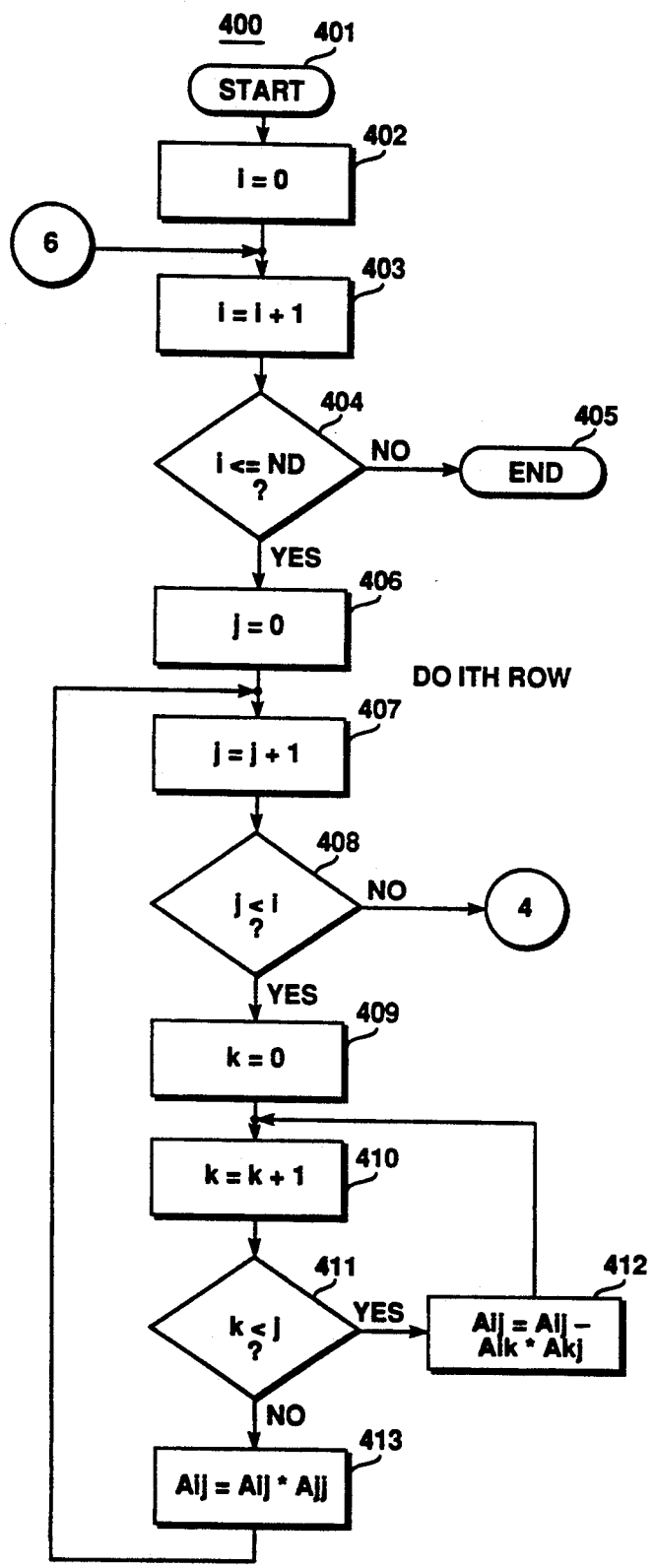
FIGS. 4a, 4b and 4c show a factoring method for a matrix used in present invention.

Once the problem has been partitioned into disk and node sections, each disk section may then be factored. The factoring method of the present invention is shown as process 400 in FIGS. 4a–4c. Factoring method 400 starts as step 401, initializes index i at step 402, and increments index i at step 403. Process 400 then determines at step 404 whether index i is still less than or equal to ND, the total number of disk sections in a row. If i is greater than ND, then process 400 ends at step 405. By the time i is greater than ND, then process 400 will have determined the values of all of the unknowns in each disk section in the matrix.

Figure 4B:
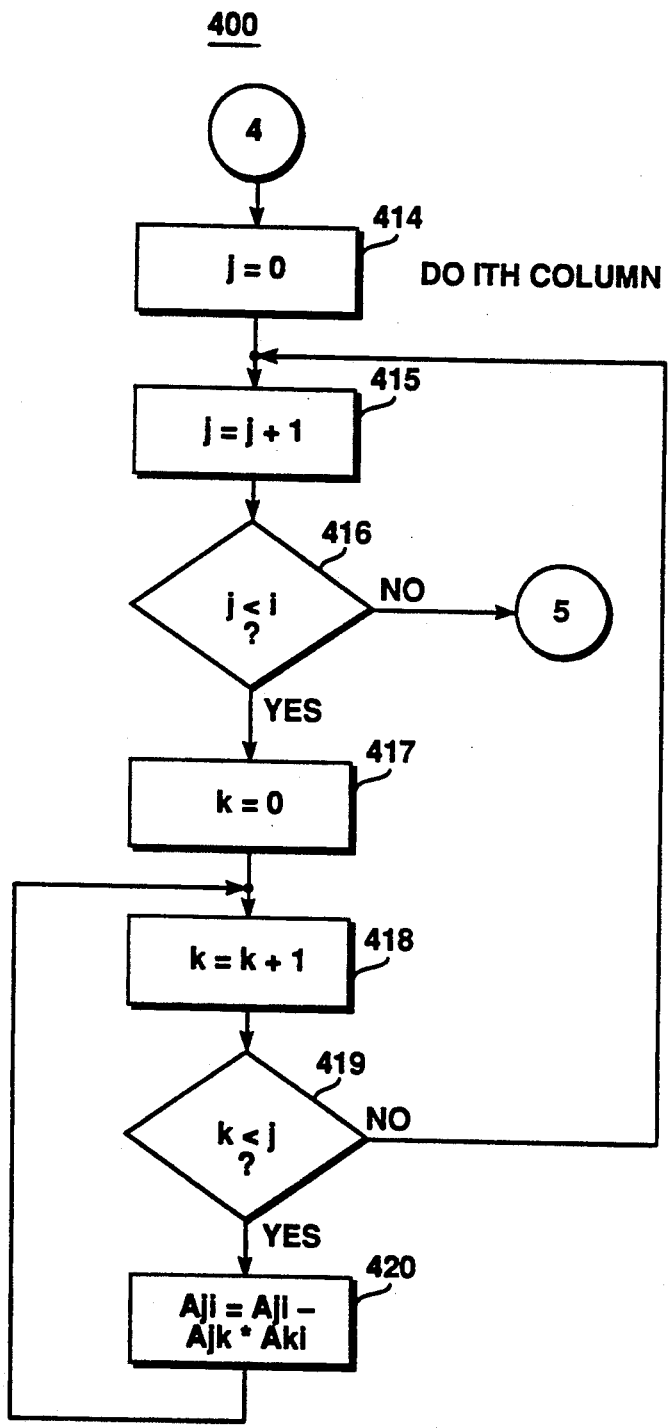

The process will continue at step 406 if i has not yet exceeded ND in process 400. Step 406 to 413 factorize an entire row of disk sections. At step 406 a second index variable j is initialized to zero and incremented at step 407. It is determined at step 408 whether the j index is still less than the i index value, and if it is not, process 400 proceeds onto the portion of the process for computing the ith column of disk sections as shown in FIG. 4b. If, however, the j index is still less than the i index as determined at step 408, then process 400 proceeds to step 409 wherein a k index is initialized to zero. The k index is incremented at step 410 and process 400 proceeds to 411 to determine whether the k index is still less than the j index. If the k index is still less than the j index then process 400 proceeds to step 412 wherein the disk section residing in the A matrix at the ith row and the jth column ($A_{ij}$) is set equal to $A_{ij} - A_{ik}*A_{kj}$. Then, step 412 will proceed back to step 410 wherein the k index is incremented and steps 410 through 412 are repeated as long as k is less than j. If k is greater than or equal to j, then process 400 proceeds to step 413 wherein $A_{ij}$ is set equal to $A_{ij}*A_{jj}$ ($A_{jj}$ is a diagonal disk section of the matrix).

Factoring process 400 continues in FIG. 4b and computes the ith column of disk sections in the matrix. Process 400 continues at step 414 wherein index variable j is initialized to zero and incremented at step 415. At step 416 it is determined whether the j index variable is less than the i index variable. If it is not, then process 400 continues to compute the ith diagonal disk section of the matrix in process 400 shown on FIG. 4c. However, if j is still less than i, then process 400 proceeds to step 417 which initializes the k index to zero and proceeds at step 418 to increment k. Step 419 determines whether k is still less than j, and if it is not, process 400 proceeds to step 420 which computes $A_{ji}$ equal to $A_{ij} - A_{jk}*A_{ki}$. 420 will then proceed back to step 418 and steps 418 through 420 will be repeated as long as k is less than j. Once k is greater than or equal to j, step 419 proceeds to step 415 which will increment the j index variable. Step 416, when j is greater than or equal to i, will proceed to the remainder of process 400 shown in FIG. 4c for computing the ith diagonal disk section.

Figure 4C:
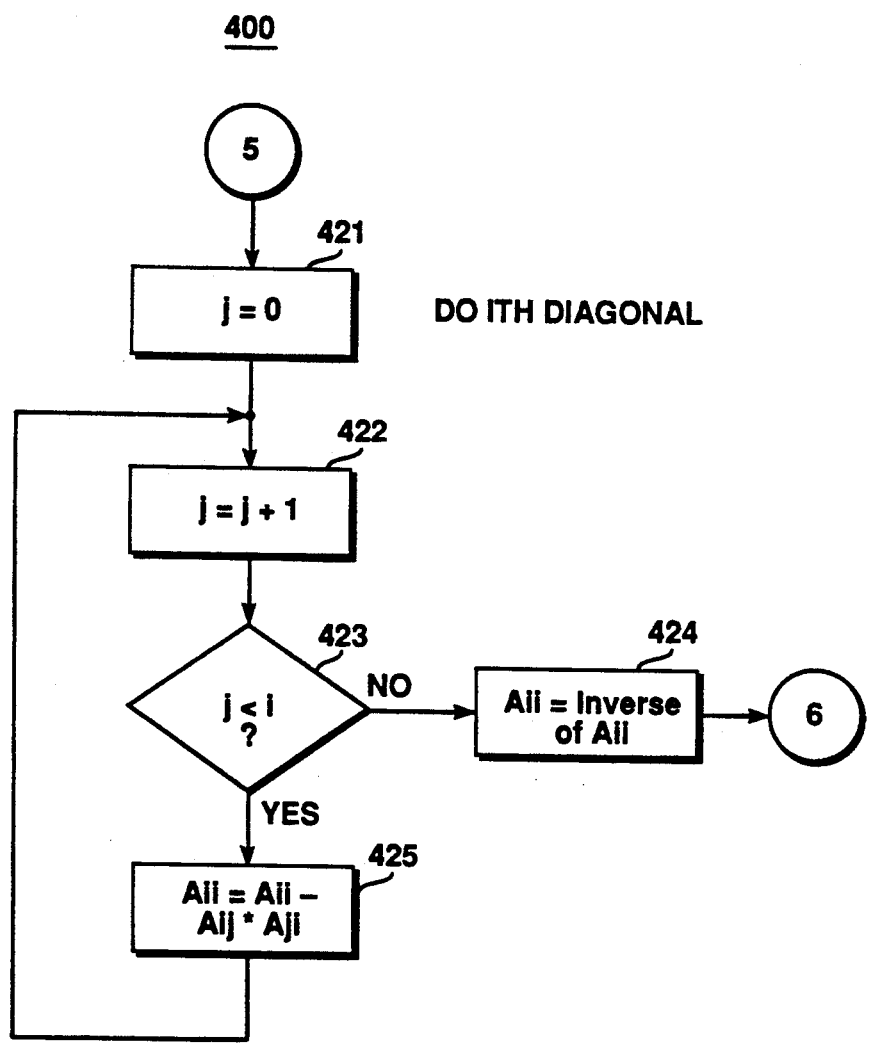

The remainder of process 400 shown in FIG. 4c factorizes the ith diagonal disk section in the matrix. Process 400 continues at step 421 to initialize index j to zero and increment j at step 422. It is determined at step 423 whether index j is still less than i. If it is, step 423 proceeds to 425. Step 425 computes the diagonal disk section $A_{ii}$ as equal to the old diagonal minus the jth row and column sections. Process 400 proceeds to step 422 which will again increment the j value and proceed to step 423. 425 will be performed for all values of j wherein j is less than i, generating the properly decomposed diagonal block value.

Once j equals i, as determined at step 423, process 400 then proceeds to 424 and computes the inverse of the diagonal disk block $A_{ii}$. This computation is performed using a Gauss-Jordan inversion technique which is shown and discussed with reference to FIGS. 7a-7d. Although an explicit inversion isn't required to compute the solution for the matrix, an inversion at step 424 substantially decreases overall execution time for the solution of the matrix in a parallel processing architecture. This is because the inversion of the block will be required for the solve phase of the method shown as process 500 in FIGS. 5a and 5b, which is discussed below. Although the inversion of the diagonal block shown at step 424 requires a large amount of computing time in the short term, it reduces the overall time for using the diagonal block by approximately a factor of ten. Gauss-Jordan inversion as shown in FIGS. 7a-7d is one alternative for computing the inverse of a matrix such as a disk section. In the preferred embodiment, it is superior to the method of using LU factorization (which is the usual way to compute an inverse for a linear processing machine) since it requires less communication and has longer average vector lengths.

Figure 6:
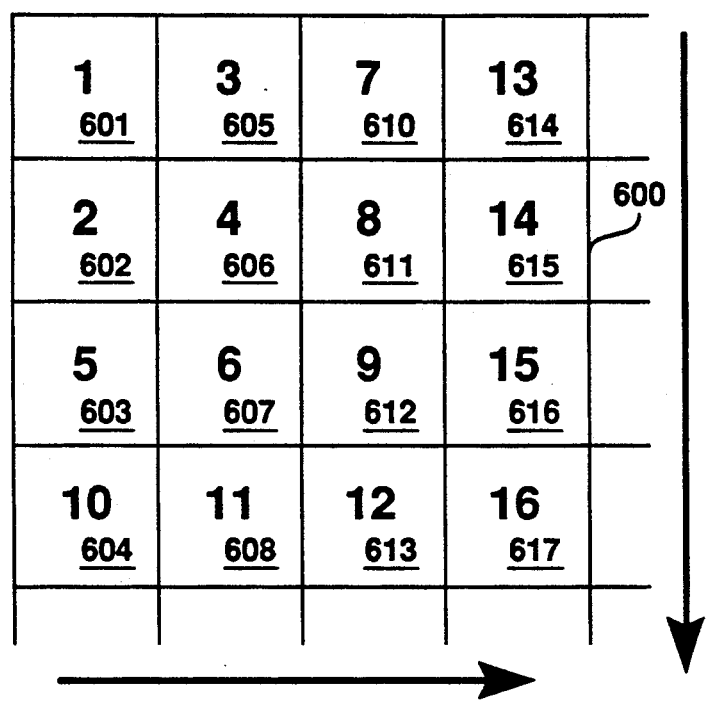
FIG. 6 shows a portion of a matrix and the order in which particular disk sections are factored in the preferred embodiment.

FIG. 6 shows the order in which disk sections are factorized for the solution of the matrix. As shown in FIG. 6, matrix 600 comprises plurality of disk sections such as 601 through 617 shown in FIG. 6. As is shown in FIG. 6, disk sections for each row are computed prior to computing the disk sections for each column. After the corresponding row and column have been computed, then the diagonal disk section of the matrix is computed. As is shown in FIG. 6, first the diagonal block of the first row and column 601 is computed. Since there are no other row or column elements for the first iteration when i=1, only the diagonal block 601 is factorized. Then, for i=2, the single row disk section 602 is computed and then the single column disk section 605 is factorized. After the row and column sections have been factorized, the diagonal disk section 606 is then computed. This process continues in this manner, for instance in the next iteration, computing disk section 603, and 607 for the ith row where i=3 and then the corresponding column blocks 610 and 611 are factorized. After 610 and 611 have been factorized, diagonal section 612 is factorized. Process 480 continues in this manner computing first the row then the column elements for each value of i until i equals the total number of disk sections in the matrix. In this example, where there are only sixteen disk sections shown, the process will finish when section 617 has been factorized. This process generally follows the diagonal, leaving each of the disks to which memory is written in a consistent state, for later processing by other nodes requiring the elements within the particular node block, and also minimizes input/output operation performed upon the disks in system 100.

Figure 5A:
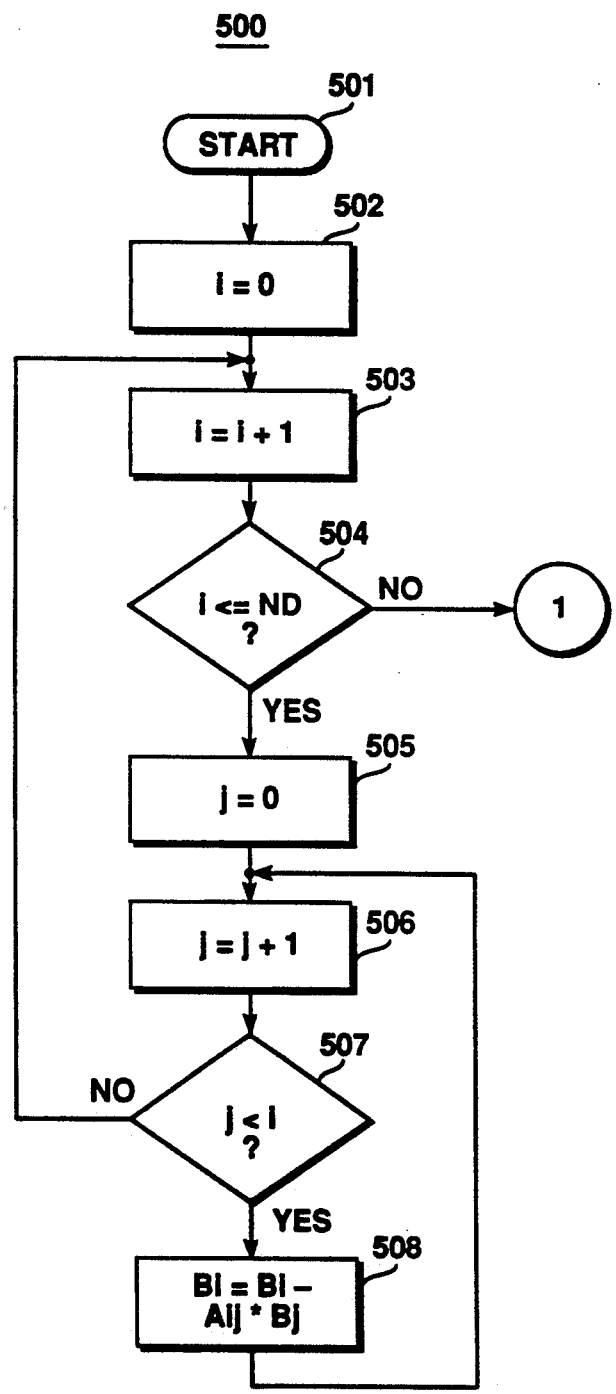
FIGS. 5a and 5b show the forward elimination and back substitution phases for the solve method of the preferred embodiment.
Figure 5B:
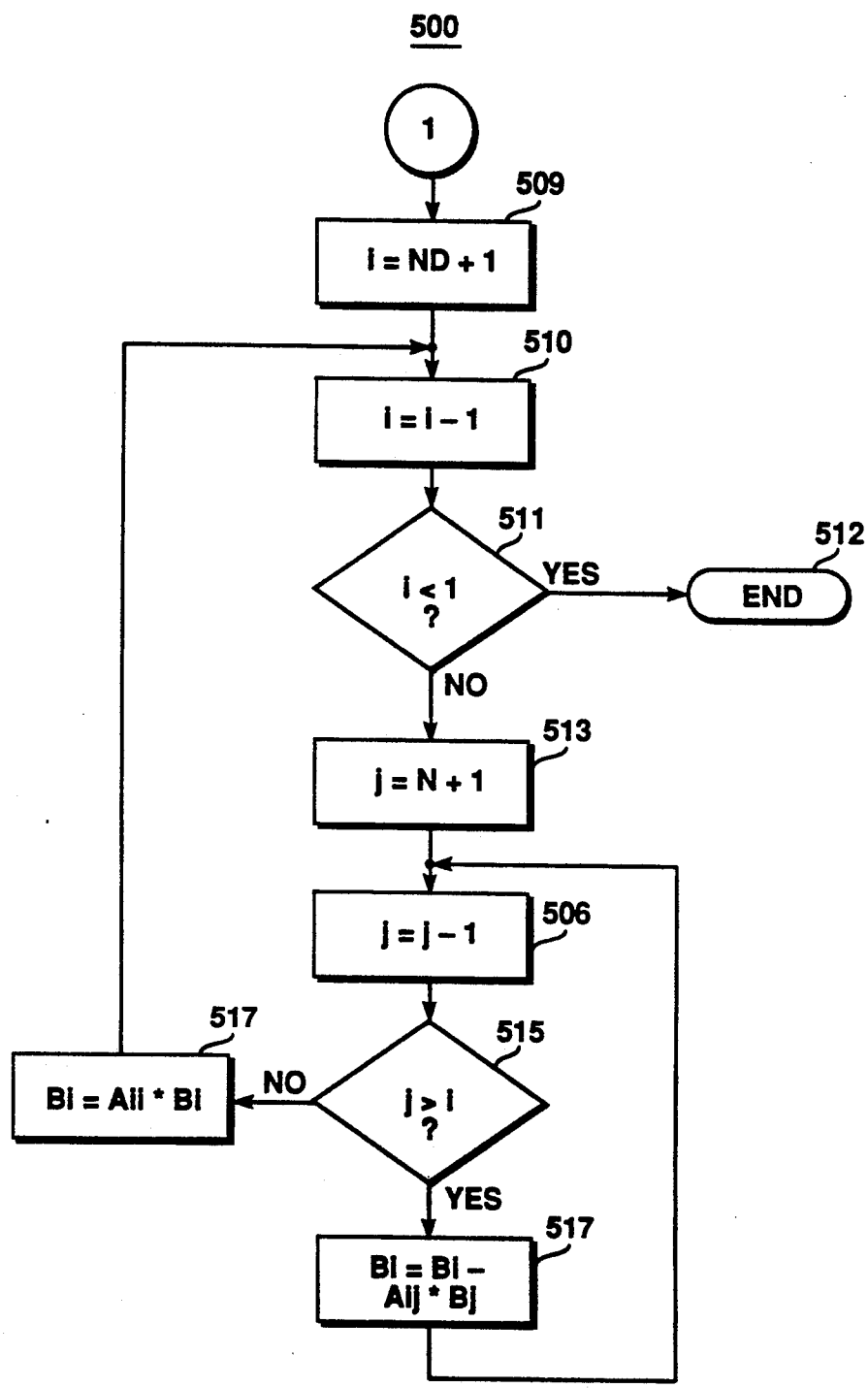

The corresponding solve method for the matrix which has been factorized by process 400 is shown as process 500 in FIGS. 5a and 5b. The forward elimination phase of solve method 500 is discussed with reference to FIG. 5a. 500 starts at 501 and initializes index i at 502. Index i is incremented at 503 and it is determined at step 504 whether i is still less than or equal to ND, the total number of disk sections in the matrix. If i is still less than or equal to ND indicating that the entire matrix has not been processed, then 504 proceeds to 505. Steps 503 through 507 will be performed as long as index i is less than or equal to ND. Step 505 initializes the index j to zero and j is incremented at step 506. If j is still less than or equal to the i index then the ith disk section of the B matrix is computed, $B_i = B_i - A_{ij}*B_j$. This calculation is performed until the j index is equal to the i index.

Step 508 is repeated for every value of j as long as j is less than i. Once j becomes greater than or equal to i, process 500 proceeds back to step 503 wherein i is incremented. Then, 508 is performed for the next value of $B_i$ until all the values of $B_i$ have been determined in the forward elimination phase 500a shown in FIG. 5a. Once all the values for $B_i$ have been determined (wherein index i exceeds ND, as detected at step 504) process 500 proceeds to the back substitution phase of solve method 500 shown in FIG. 5b. The back substitution phase of process 500 starts at 509 shown on FIG. 5b wherein the i index is set equal to ND+1. At step 510, i is immediately decremented by one. Then, at step 511, it is determined whether i has become less than one (e.g. 0). Once i has become less than one, the back substitution phase of solve method 500 is completed at step 512. However, if index i has not yet become less than one, step 513 sets a second index variable j also equal to ND+1. Again, as with i above, j is immediately decremented by one at step 514, and it is determined at step 515 whether j is greater than i. This determines whether the back substitution phase is complete (as indicated by index j being greater than index i). If the back substitution phase is complete, then step 516 is performed wherein the ith disk section in the B matrix is set equal to the existing $B_i$ disk block multiplied by the diagonal disk section, $A_{ii}$. Because the $A_{ii}$ diagonal has been previously inverted, the result placed in $B_i$ at step 516 should contain that portion of the solution for the matrix. If, however, all of the columns in the ith row of the A matrix have not been computed into the current $B_i$ disk section, then step 515 proceeds to step 517 wherein the $B_i$ disk section is set equal to the current $B_i$ disk section less the jth column of the ith row in A multiplied by $B_j$. Step 517 returns to step 514 wherein j is again decremented, and step 517 is repetitively executed until j is no longer greater than i as determined at step 515. Steps 510–517 are repetitively performed until, as detected at step 511, index i has become less than one. By that time, all of the unknowns for the B matrix has been determined. Thus, the solution for the system of linear equations represented by the matrices A and B, have now been determined.

The inversion, performed upon diagonal disk section in the matrix, and shown in FIG. 4c as step 424 is now discussed with reference to FIGS. 7a–d. This is known as Gauss-Jordan inversion. Although the preferred embodiment uses Gauss-Jordan inversion a shown in FIGS. 7a–7d, in alternative embodiments, other inversion methods may be used. Inversion process 700 is shown starting on FIG. 7a at step 701 and index variable i is initialized to 0 at step 702. Step 703 increments i and it is determined at step 704 whether i is less than or equal to L (the number of elements in the disk section being inverted). If it is not, then process 700 ends at step 705, and all of the elements in this diagonal block of the matrix are now inverted. At step 706, the j index value is initialized to i, and a maximum value (MAX) is initialized to 0 at step 707. Then, at step 709, it is determined whether j is less than or equal to L and, if it is not, process 700 proceeds to step 713 shown on FIG. 7b. If, however, j is still less than or equal to N, then process 700 proceeds to step 710. Step 710 determines whether the absolute value (using an absolute value function called ABS) of $A_{ji}$ is greater than the MAX value which has been determined up to the present. If it is not, then process 700 repetitively executes steps 708 through 710 until either j is equal to N at step 709, or the absolute value of the element value $A_{ji}$(ABS(Aji)) is greater than MAX. If it is, then step 710 leads to step 711 which sets MAX equal to the absolute value of $A_{ji}$ and step 712 which stores the j index value in m. This maintains track of the element having the greatest magnitude in the ith row. Once all of the elements in the ith row have been processed, as determined at step 709, process 700 proceeds to step 713 on FIG. 7b.

Figure 7A:
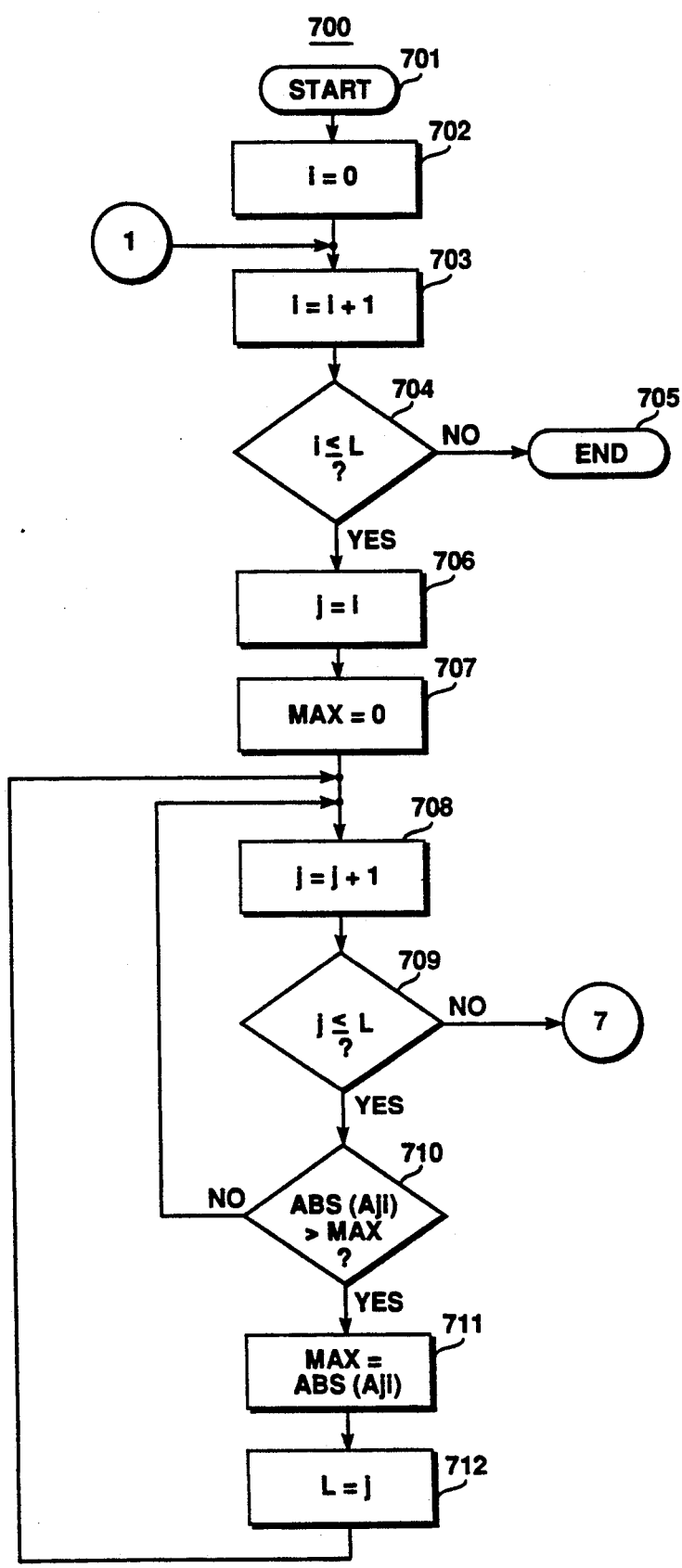
FIGS. 7a, 7b, 7c, and 7d show a method used for inverting a block in a matrix.
Figure 7B:
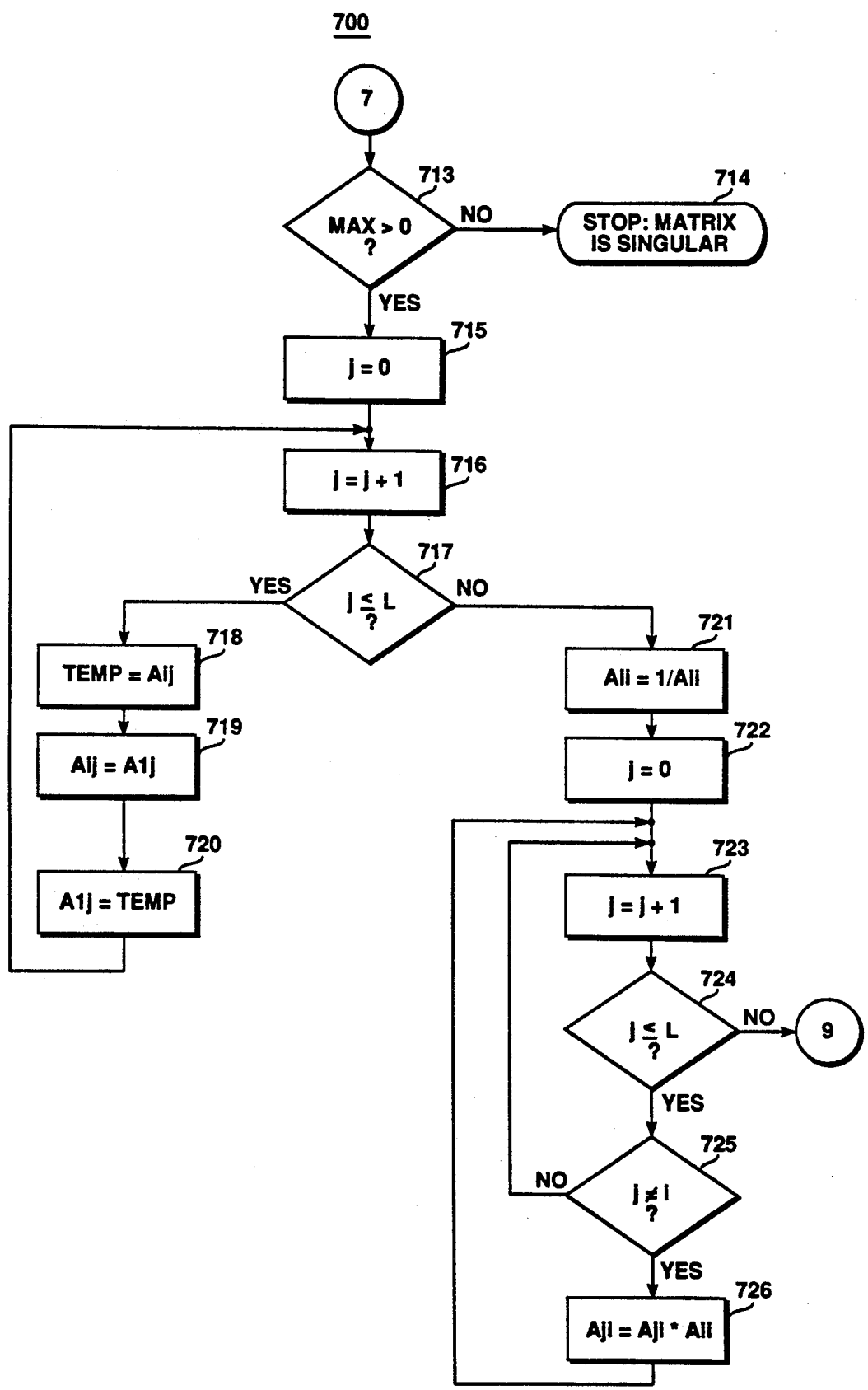

At step 713 shown on FIG. 7b, it is determined whether MAX is greater than 0. If it is not, then the matrix is singular and all processing stops at step 714. An inverse cannot be computed for this particular matrix. If MAX is greater than 0, however, processing continues and step 715 initializes the j index value to 0. Index j is incremented at step 716, and it is determined at step 717 whether j has reached N. If j has not yet reached L, as determined at step 717, steps 718, 719, and 720 are executed until such time as j is no longer less than or equal to L. Steps 718 through 720 set a temporary variable (TEMP) equal to $A_{ij}$. At step 719, $A_{ij}$ is set equal to $A_{mj}$, the previously computed pivot (which element contained MAX) in the row. $A_{mj}$ is then set equal to TEMP at step 720 switching the values contained in the two positions, $A_{ij}$ and $A_{mj}$.

If, however, j exceeds L (j is no longer less than or equal to N), process 700 proceeds to step 721 which sets the diagonal element $A_{ii}$ equal to its inverse. Then, process 700 proceeds to step 722 initializing j to 0, and then to step 723 which increments j. Again, at step 724, it is determined whether j is less than or equal to L. If it is not, process 700 proceeds to step 727 shown on FIG. 7c. If it is, process 700 proceeds to steps 725 and 726. Step 725 determines whether the j and i index variables are equal and if they are, process 700 proceeds back to step 723. If j is not equal to i, step 726 is performed wherein the current value $A_{ji}$ is set equal to the current Aji value multiplied by the diagonal element value $A_{ii}$. Then, process 700 proceeds back to step 723. When j is no longer less than or equal to L as determined at step 724, process 700 proceeds to step 727 shown in FIG. 7c.

Figure 7C:
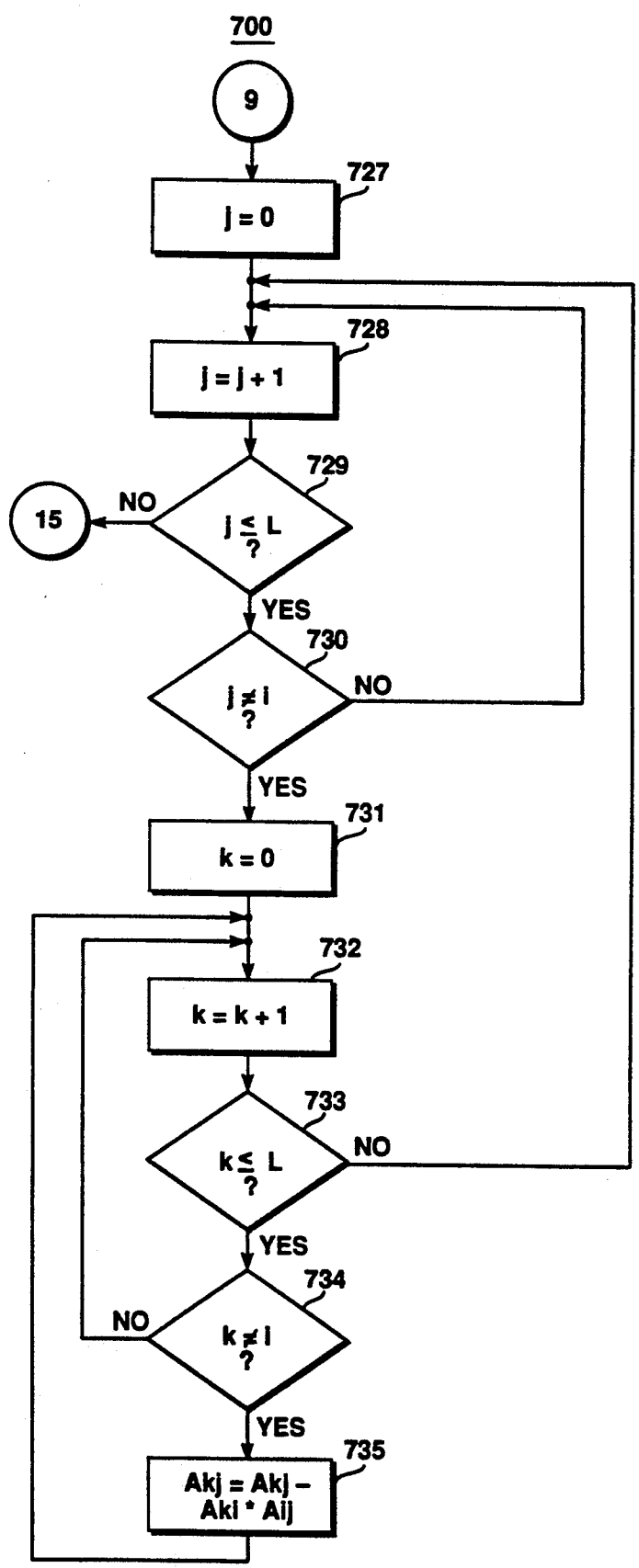

As shown in FIG. 7c, step 727 initializes j again to 0 and increments j at step 728. At step 729, j is again checked to see whether it is still less than or equal to N. If it is, it is determined whether j is equal to i, and if it is, step 730 returns back to step 728 for the incrementing of the j index variable. If it is not equal to i, step 730 proceeds to step 731 which initializes k, and proceeds to step 732 which increments k. It is then determined at step 733 whether k is less than or equal to L. If it is not, process 700 proceeds back to step 728 again. If k is still less than or equal to L, then step 734 is performed wherein the k index variable is checked to see whether it is not equal to i. If it is not equal to i, then step 735 is performed wherein the column value $A_{kj}$ is set equal to the current value of $A_{kj}$ minus the product of $A_{ki}$ and $A_{ij}$. Then, step 735 leads back to step 732 which, again, increments k at step 732 and determines whether the entire row has been processed by checking the k index variable at step 733. Once the value of the j index is determined to be no longer less than or equal to L at step 729, process 700 proceeds to step 736 shown on FIG. 7d.

Figure 7D:
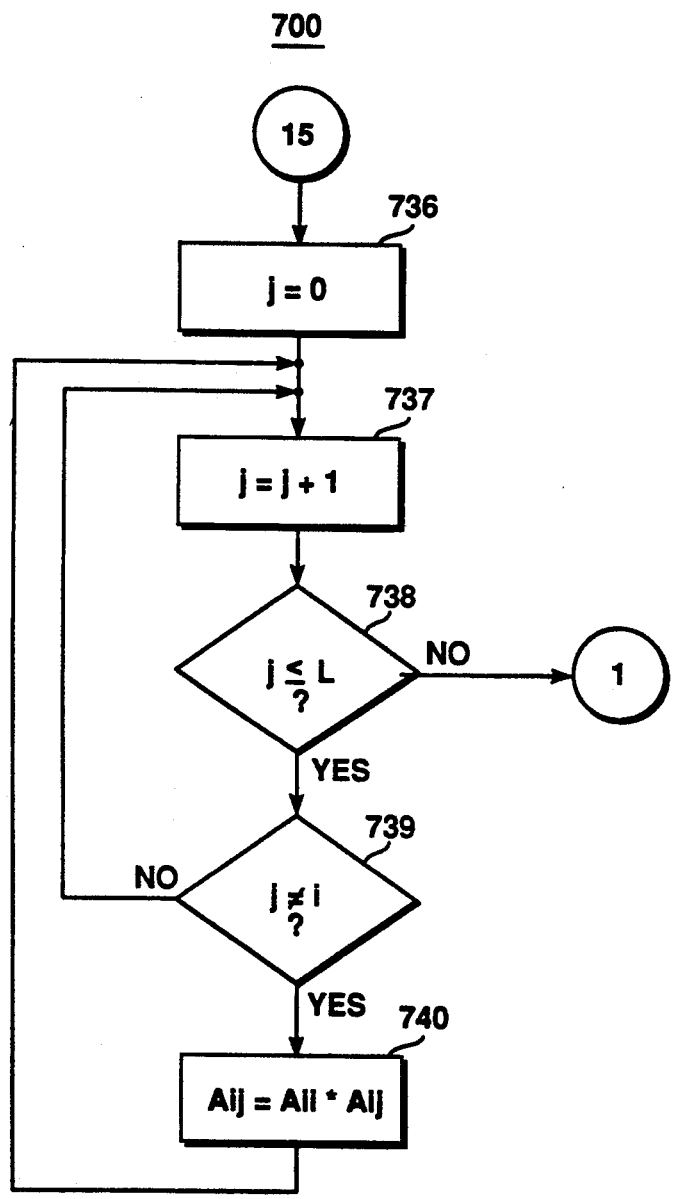

As shown on FIG. 7d, step 736 initializes j to 0 and j is incremented at step 737. Step 737 proceeds to step 738 wherein j is checked to see whether it is still less than or equal to L, indicating that the entire row has finished processing. If it is, then process 700 proceeds back to step 703 on FIG. 7a, and the entire process 700 is performed over again until i is greater than L. If it is still less than or equal to L, then it is determined whether j is equal to i at step 739. If it is, step 739 leads back to step 737 wherein steps 737 through 739 are again performed. If, however, the j and i indices are not the same, as determined at step 739, step 740 is performed wherein the current row value $A_{ij}$ is set equal to the negative value of the diagonal Aii multiplied by the current value of row element $A_{ij}$. Then, step 740 proceeds back to 737 and steps 737 through 739 are again performed. Thus, when process 700 leads back to step 703 and 704 (i has exceeded the value of L indicating that the entire diagonal disk block is now inverted) process 700 ends at step 705 shown on FIG. 7a. The entire diagonal disk block in the A matrix is now inverted.

All of the compute nodes in system 100 assist in performing methods 400 and 500 shown in FIGS. 4a–4c and 5a and 5b. There are three basic operations which must be performed upon disk sections in the matrix:

1. A=A−B*C
2. A=A*C
3. A=inverse of A

Therefore, each node must have available to it particular node blocks from within the matrix to perform the above calculations. The distribution of node blocks in the matrix to nodes is discussed with reference to FIG. 8.

Figure 8:
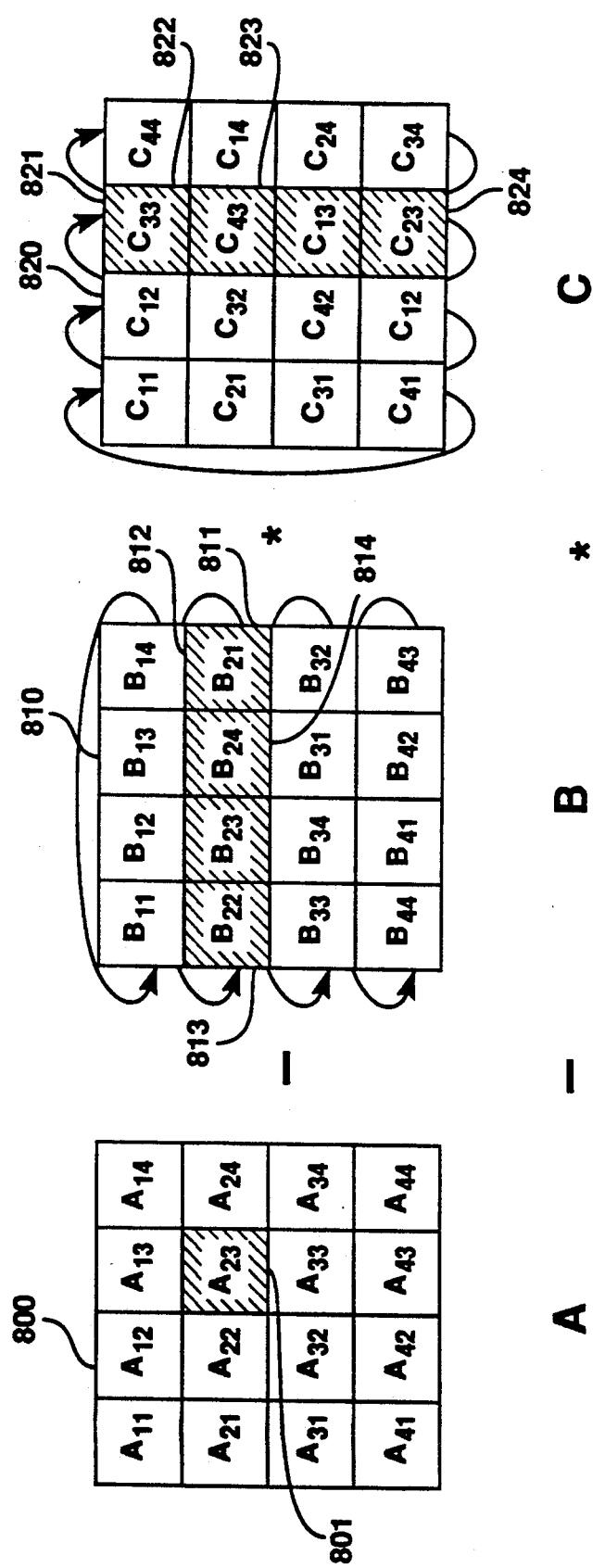
FIG. 8 shows which node sections of the matrix are required by a compute node at a given time and the order in which those node sections are passed to other nodes in the parallel processing computer.

As shown in FIG. 8, the node blocks in the disk section of the A matrix needed for factoring throughout is graphically represented for calculating A=A−B*C. FIG. 8 shows an example case of a system having access to sections of the matrix wherein the parallel processing system has sixteen nodes. For computing a particular value (such as A= A−BC or A=BC), the node must have access to a node section of the A values being computed upon an entire row of B node blocks, and a column of C node blocks from the disk section. By carefully choosing which sections to start with, each node can compute $A=A-B*C$ for a pair of node sections while simultaneously passing a B node section to the compute node responsible for handling the next node section to the right of the current node section and a C node section to the next compute node "down" (responsible for handling the next node section down in the disk section).

For instance, as shown on FIG. 8, for computing the value of node block $A_{23}$ 801, the compute node generating $A_{23}$ 801 requires access to the row 811 from the B disk section 810, and the column of node section value 821 of C disk section 820. As shown graphically on FIG. 8, when a particular B node section has been computed, such as $B_{21}$ 812, that section is passed to the compute node generating the $B_{22}$ 813 node section. $B_{24}$ 814 passes its block to $B_{21}$ 812, the node handling the right-next section when $B_{24}$ 814 has been computed. This continues in a circular fashion throughout the row 801 as shown in FIG. 8.

In addition, as each C column node block, such as in column 821, is computed, those block are passed to the compute node responsible for processing the next C node section down the column. For instance, when the $C_{33}$ node section 822 is computed, that section is passed to the compute node handling the next section down, $C_{43}$ 823. As with the B section node blocks, the column wraps around, and when the compute node handling the last node block in the column, such as $C_{23}$ 824, is computed, that block is passed to the node handling the section in the first column, such as that computing $C_{33}$ 822. The sequence of processing node sections in each disk section, such as 800, 810 and 820, is complete when each processor has an entire row of B node sections and entire column of C node sections.

Figure 9:
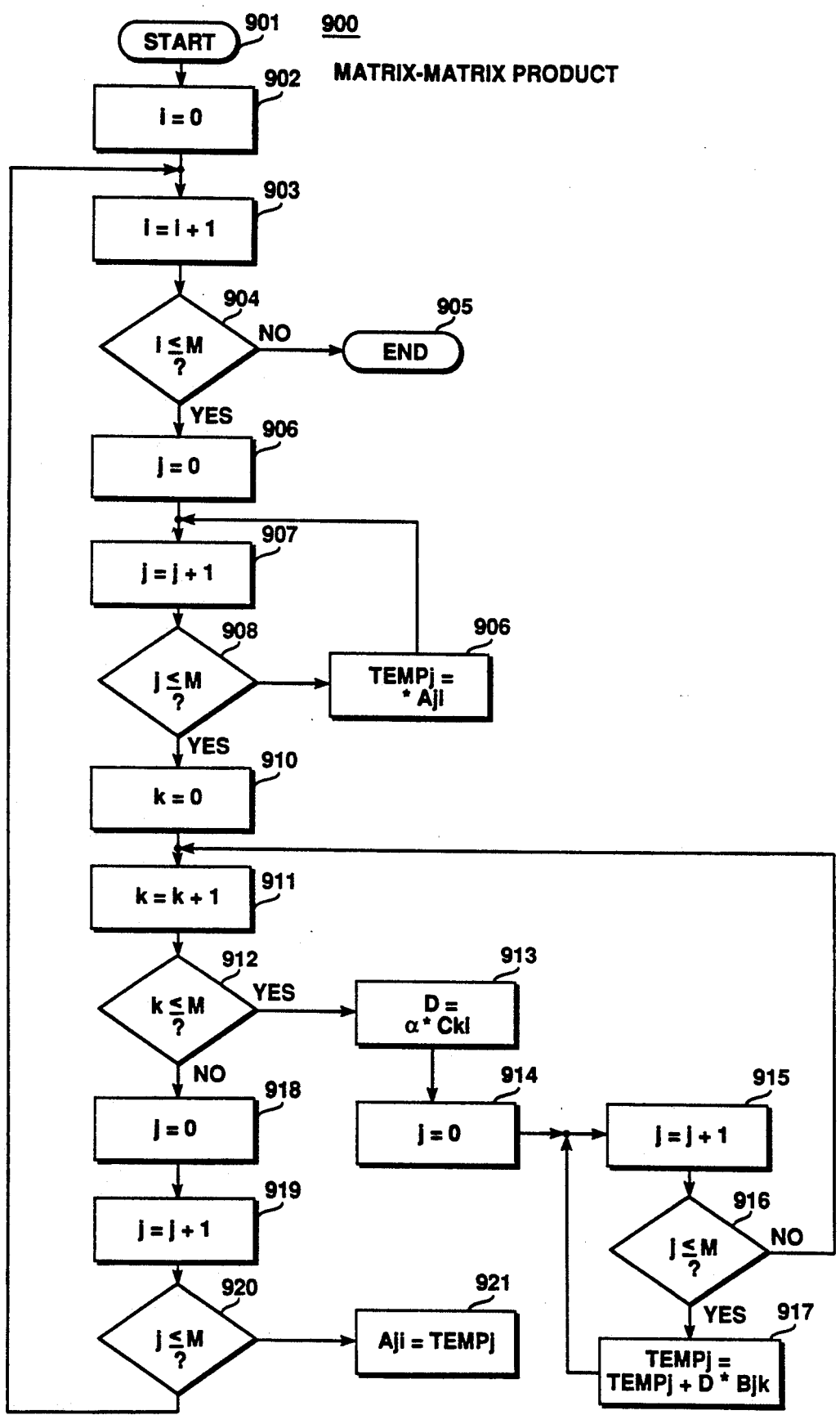
FIG. 9 shows the method used for a node section matrix-matrix multiply operation which is performed by each compute node in the preferred embodiment.

In order to generate the matrix products required by processes 400 and 500, each node, using the distribution and value passing shown in FIG. 8, must compute a product of two matrices. This process is shown as process 900 in FIG. 9. Process 900 is an example of a BLAS3 ZGEMM standard matrix-matrix multiply routine. Process 900 generates a matrix-matrix product wherein two matrices B and C are of dimensions M×M, the result is placed in A, the coefficients $\alpha$ and $\beta$ are passed and process 900 uses temporary variable D, and temporary vector TEMP of dimension M. Matrix-matrix multiply process 900 starts at step 901 and initializes index i equal to 0 at step 902. At step 903, i is incremented by 1, and 904 determines whether i is still less than M, the number of elements in the matrices being multiplied. Process 900 ends at step 905 if the i index is no longer less than or equal to M, the total number of elements in the matrix. Process 900 continues to step 906 which initializes the j index to 0, and proceeds to 907 which increments j. Step 908 determines whether j is still less than or equal to M, and if it is, step 909 is performed wherein a temporary variable $TEMP_j$ is set equal to $\beta*A_{ji}$. Step 909 then returns to step 907, and steps 907 through 909 are repetitively executed. If, however, j is no longer less than or equal to M, step 908 proceeds to step 910 wherein k is initialized to 0 and proceeds to step 911 which increments k by 1.

Process 900 continues at step 912 wherein it is determined whether k is still less than or equal to N. If k is still less than or equal to M, process 900 proceeds to step 913 which sets D equal to the product of $\alpha$ and $C_{ki}$. At step 914, index j is again initialized to 0 and j is incremented at step 915. If j is still less than or equal to M, as determined in step 916, step 917 sets $TEMP_j$ equal to the current value of $TEMP_j$ plus the product of D and $B_{jk}$. Then, step 917 returns to step 915, and steps 915 through 917 are repetitively executed until j exceeds N, as determined in step 916. If j exceeds M, as determined in step 916, process 900 proceeds to step 911 and 911 through 917 are again performed as long as k and j are less than or equal to M.

Once k is greater than M, as determined in step 912, process 900 proceeds to step 918 which also initializes j equal to 0. Then j is incremented at step 919, and process 900 proceeds to step 920. Step 920 determines whether j is still less than or equal to M, and if it is, process 900 proceeds to 921 which sets the $A_{ji}$ element equal to $TEMP_j$. Then, step 921 proceeds to step 919, and steps 919 through 921 are repetitively executed until j is no long less than or equal to M, as determined in step 920. Once j is no longer less than or equal to M, as determined in step 920, process 900 proceeds back to step 903, which again increments i and the remainder of the B and C matrices are processed. At the end of process 900, therefore, the node has fully computed a matrix-matrix product for a given pair of matrices B and C.

Although the method discussed with reference to FIGS. 4a–c and 5a–b have been described with reference to a system 100 utilizing magnetic media disk drives only such as 181 and 182 in FIG. 1, a similar system of distribution of data across the compute nodes in the system may be used for even larger systems of linear equations with larger capacity fixed storage devices. Instead of using solely magnetic media as in the preferred embodiment, in an alternative embodiment, optical disk drive units such as 184 can be employed increasing the number of disk sections. This is done by distributing the storage of the voluminous number of blocks on individual optical disks using a disk carousel device such as 184. In addition, tape drive unit 183 shown in FIG. 1 may be used for spooling large sections of disks for larger matrices in another alternative embodiment.

Although the preferred embodiment has been discussed with reference to using an even number of compute nodes (for instance, 16 or 64), the method as set forth in FIGS. 4a–4c and 5a and 5b may be implemented on a system utilizing an odd power of two compute nodes (for instance, 2, 8, 32, or 128). In the factoring method, computing disk sections of the ith row of the factoring and computing the disk sections of the ith column are independent. Thus, on a system employing 128 compute nodes, for example, 64 nodes could be assigned to compute the rows of the factoring, and 64 nodes could be assigned to compute the columns. Only the diagonal block computation requires some synchronization between the two sets of compute nodes. Therefore, to solve this problem, the diagonal block should be viewed as part of the column. Since the row operations require the additional step of multiplying by a diagonal disk section, the amount of work done by the row processors and the column processors is equal, up to the step of inverting the diagonal disk section. By sharing the columns of the diagonal disk sections over all the processors, Gauss-Jordan inversion can be implemented over all the processors and all of the processors can be kept busy all the time. In the solution phase, as shown in FIGS. 5a and 5b, each column of the solution matrix is independent so that all processors can be kept busy by having one set of 64 nodes compute one set of solutions and the other set of 64 nodes compute a different set of solutions.

By using combinations of disk drive storage or other forms of media, in conjunction with a parallel processing architecture as is shown in FIG. 1, very large systems of dense linear equations may be solved. Increasing the performance of such systems, can be achieved by carefully selecting particular methods for solving such systems of linear equations. As is discussed above, although explicit inversion of diagonal blocks of a matrix in such a system of linear equations requires lots of CPU overhead for short periods of time, this scheme pays for itself later because the time required for using the diagonal block can be reduced by as much as a factor of 10. This occurs because the use of the diagonal disk sections are much more efficient after the inversion. Using this particular scheme in system 100 will greatly reduce the real time it takes to compute a dense system of linear equations such as that required by radar cross-section problems and simulations of air flow across an air-foil.

Thus, a method for solving very dense systems of linear equations on a parallel processing computer has been described. Although the present invention has been described particularly with reference to FIGS. 1-9, it will be apparent to one skilled in the art that the present invention has utility far exceeding that disclosed in the Figures. It is contemplated that many changes and modifications may be made, by one of ordinary skill in the art, without departing from the spirit and scope of the invention, as disclosed above.

What is claimed is:

1. A method for computing, in a parallel processing system, a solution to a system of linear equations, coefficients of the linear equations being represented in a matrix and right-hand sides of the linear equations being represented in a vector, said matrix and said vector being stored as electromagnetic impulses on a non-volatile medium; the parallel processing system comprising a plurality of compute nodes coupled in parallel, each of the plurality of compute nodes comprising a processor, a memory, and a non-volatile storage medium, a plurality of means for communicating between each of the plurality of compute nodes in the parallel processing system, means for partitioning the matrix into ND disk sections and storing said ND disk sections as electromagnetic impulses on each of the non-volatile storage medium of the plurality of compute nodes, and means for partitioning each of the ND disk sections into a plurality of node sections, each of the node sections being respectively assigned to each of the plurality of compute nodes; said method, performed by the plurality of compute nodes cooperating, through communications with neighboring ones of said plurality of compute nodes on the plurality of communicating means, comprising the steps of:

factoring respectively assigned node sections of first a row, then a column, and then a diagonal of each of the ND disk sections, and communicating results of said factoring to neighboring compute nodes while storing said results as electromagnetic impulses onto the non-volatile storage medium of each of the plurality of compute nodes;

inverting the factored diagonal of each of the ND disk sections stored on each of the non-volatile storage medium of the plurality of compute nodes and storing results of said inversion as electromagnetic impulses on the non-volatile storage medium of each of the plurality of compute nodes;

forward eliminating each of the factored ND disk sections stored as electromagnetic impulses on the non-volatile storage medium of each of the plurality of compute nodes and storing results of said forward elimination as electromagnetic impulses on the non-volatile storage medium of each of the plurality of compute nodes;

back substituting each of the forward eliminated ND disk sections and storing results of said back substitution as electromagnetic impulses on the non-volatile storage medium of each of the plurality of compute nodes; and generating said solution to said system of linear equations by sequentially fetching the results of said back substitution and the results of said inversion from the non-volatile storage medium of each of the plurality of compute nodes and multiplying said results of said back substitution by said results of said inversion.

2. The method of claim 1 wherein each of said plurality of compute nodes factors a plurality of elements in each of the plurality of j row sections, plurality of j column sections and said j diagonal section.

3. The method of claim 2 wherein the non-volatile storage medium comprises a magnetic disk.

4. The method of claim 2 wherein the non-volatile storage medium comprises an optical disk.

5. A method for computing, in a parallel processing system, a solution to a system of linear equations, coefficients of the linear equations being represented in a first matrix and right-hand sides of the linear equations being represented in a first vector, said first matrix and said first vector being stored as electromagnetic impulses on a non-volatile medium; the parallel processing system comprising a plurality of compute nodes coupled in parallel, each of the plurality of compute nodes comprising a processor, a memory, and a non-volatile storage medium, a plurality of means for communicating between each of the plurality of compute nodes in the parallel processing system, means for partitioning the first matrix into ND rows, ND columns, and ND diagonal disk sections and storing said ND disk sections as electromagnetic impulses on each of the non-volatile storage medium of the plurality of compute nodes, and means for partitioning each of the ND disk sections into a plurality of node sections, each of the node sections being respectively assigned to each of the plurality of compute nodes; said method, performed by the plurality of compute nodes cooperating, through communications with neighboring ones of said plurality of compute nodes on the plurality of communicating means, to perform the steps of:

factoring respectively assigned node sections of first a row, then a column, and then a diagonal of each of the ND disk sections, and communicating results of said factoring to neighboring compute nodes while storing said results as electromagnetic impulses onto the non-volatile storage medium of each of the plurality of compute nodes;

inverting the factored diagonal of each of the ND disk sections stored on each of the non-volatile storage medium of the plurality of compute nodes and storing results of said inversion as electromagnetic impulses on the non-volatile storage medium of each of the plurality of compute nodes;

forward eliminating each of the factored ND disk sections stored as electromagnetic impulses on the non-volatile storage medium of each of the plurality of compute nodes and storing results of said forward elimination as electromagnetic impulses on the non-volatile storage medium of each of the plurality of compute nodes;

back substituting each of the forward eliminated ND disk sections and storing results of said back substitution as electromagnetic impulses on the non-volatile storage medium of each of the plurality of compute nodes; and generating said solution to said system of linear equations by sequentially fetching the results of said back substitution and the results of said inversion from the non-volatile storage medium of each of the plurality of compute nodes and multiplying said results of said back substitution by said results of said inversion.

6. The method of claim 5 wherein each of said plurality of compute nodes factors a portion of the j row, a portion of the j column and a portion of the j diagonal section.

7. The method of claim 6 wherein the non-volatile storage medium comprises a magnetic disk.

8. The method of claim 6 wherein the non-volatile storage medium comprises an optical disk.

9. A parallel processing system for computing a solution to a system of linear equations, coefficients of the linear equations being represented in a matrix and right-hand sides of the linear equations being represented in a vector, said matrix and said vector being stored as electromagnetic impulses on a non-volatile medium, comprising:

a plurality of computing units coupled in parallel, each of the plurality of computing units comprising a processor, a memory, and a non-volatile storage medium;

a plurality of means for communicating between each of the plurality of computing units in the parallel processing system;

means for partitioning the matrix into ND disk sections and storing said ND disk sections as electromagnetic impulses on each of the non-volatile storage medium of the plurality of computing units;

means for partitioning each of the ND disk sections into a plurality of node sections, each of the node sections being respectively assigned to each of the plurality of computing units;

wherein the plurality of computing units cooperating, through communications with neighboring ones of said plurality of computing units on the plurality of communicating means, to perform the steps of:

factoring respectively assigned node sections of first a row, then a column, and then a diagonal of each of the ND disk sections, and communicating results of said factoring to neighboring computing units while storing said results as electromagnetic impulses onto the non-volatile storage medium of each of the plurality of computing units;

inverting the factored diagonal of each of the ND disk sections stored on each of the non-volatile storage medium of the plurality of computing units and storing results of said inversion as electromagnetic impulses on the non-volatile storage medium of each of the plurality of computing units;

forward eliminating each of the factored ND disk sections stored as electromagnetic impulses on the non-volatile storage medium of each of the plurality of computing units and storing results of said forward elimination as electromagnetic impulses on the non-volatile storage medium of each of the plurality of computing units; and back substituting each of the forward eliminated ND disk sections and storing results of said back substitution as electromagnetic impulses on the non-volatile storage medium of each of the plurality of computing units;

means for generating said solution to said system of linear equations by sequentially fetching the results of said back substitution and the results of said inversion from the non-volatile storage medium of each of the plurality of computing units and multiplying said results of said back substitution by said results of said inversion.

10. A parallel processing system for computing a solution to a system of linear equations, coefficients of the linear equations being represented in a matrix and right-hand sides of the linear equations being represented in a vector, said matrix and said vector being stored as electromagnetic impulses on a non-volatile medium, comprising:

a plurality of computing units coupled in parallel, each of the plurality of computing units comprising a processor, a memory, and a non-volatile storage medium;

a plurality of means for communicating between each of the plurality of computing units in the parallel processing system;

means for partitioning the matrix into ND disk sections and storing said ND disk sections as electromagnetic impulses on each of the non-volatile storage medium of the plurality of computing units;

means for partitioning each of the ND disk sections into a plurality of node sections, each of the node sections being respectively assigned to each of the plurality of computing units;

wherein the plurality of computing units cooperating, through communications with neighboring ones of said plurality of computing units on the plurality of communicating means, to perform the steps of:

factoring respectively assigned node sections of first a column, then a row, and then a diagonal of each of the ND disk sections, and communicating results of said factoring to neighboring computing units while storing said results as electromagnetic impulses onto the non-volatile storage medium of each of the plurality of computing units;

inverting the factored diagonal of each of the ND disk sections stored on each of the non-volatile storage medium of the plurality of computing units and storing results of said inversion as electromagnetic impulses on the non-volatile storage medium of each of the plurality of computing units;

forward eliminating each of the factored ND disk sections stored as electromagnetic impulses on the non-volatile storage medium of each of the plurality of computing units and storing results of said forward elimination as electromagnetic impulses on the non-volatile storage medium of each of the plurality of computing units; and back substituting each of the forward eliminated ND disk sections and storing results of said back substitution as electromagnetic impulses on the non-volatile storage medium of each of the plurality of computing units;

means for generating said solution to said system of linear equations by sequentially fetching the results of said back substitution and the results of said inversion from the non-volatile storage medium of each of the plurality of computing units and multiplying said results of said back substitution by said results of said inversion.

11. A parallel processing system for computing a solution to a system of linear equations, coefficients of the linear equations being represented in a matrix and right-hand sides of the linear equations being represented in a vector, said matrix and said vector being stored as magneto optical impulses on a non-volatile medium, comprising:

a plurality of computing units coupled in parallel, each of the plurality of computing units comprising a processor, a memory, and a non-volatile storage medium;

a plurality of means for communicating between each of the plurality of computing units in the parallel processing system;

means for partitioning the matrix into ND disk sections and storing said ND disk sections as magneto optical impulses on each of the non-volatile storage medium of the plurality of computing units;

means for partitioning each of the ND disk sections into a plurality of node sections, each of the node sections being respectively assigned to each of the plurality of computing units;

wherein the plurality of computing units cooperating, through communications with neighboring ones of said plurality of computing units on the plurality of communicating means, to perform the steps of:

factoring respectively assigned node sections of first a row, then a column, and then a diagonal of each of the ND disk sections, and communicating results of said factoring to neighboring computing units while storing said results as magneto optical impulses onto the non-volatile storage medium of each of the plurality of computing units;

inverting the factored diagonal of each of the ND disk sections stored on each of the non-volatile storage medium of the plurality of computing units and storing results of said inversion as magneto optical impulses on the non-volatile storage medium of each of the plurality of computing units;

forward eliminating each of the factored ND disk sections stored as magneto optical impulses on the non-volatile storage medium of each of the plurality of computing units and storing results of said forward elimination as magneto optical impulses on the non-volatile storage medium of each of the plurality of computing units; and back substituting each of the forward eliminated ND disk sections and storing results of said back substitution as magneto optical impulses on the non-volatile storage medium of each of the plurality of computing units;

means for generating said solution to said system of linear equations by sequentially fetching the results of said back substitution and the results of said inversion from the non-volatile storage medium of each of the plurality of computing units and multiplying said results of said back substitution by said results of said inversion.

* * * * *